United States Patent [19]

Brearley et al.

[11] Patent Number: 5,674,974
[45] Date of Patent: Oct. 7, 1997

[54] CONTINUOUS POLYMERIZATION PROCESS FOR POLYAMIDES

[75] Inventors: Ann Marion Brearley, West Chester, Pa.; James Joseph Lang, Wilmington, Del.; Ernest Keith Andrew Marchildon, Kingston, Canada

[73] Assignee: E. I. Du Pont de Nemours and Company, Wilmington, Del.

[21] Appl. No.: 344,804

[22] Filed: Nov. 23, 1994

[51] Int. Cl.[6] .......................... C08G 69/28; C08G 69/26
[52] U.S. Cl. .......................... 528/340; 528/323; 528/324; 528/335; 528/339; 528/347; 528/349
[58] Field of Search .......................... 528/340, 335, 528/347, 349, 323, 324, 339

[56] References Cited

U.S. PATENT DOCUMENTS

| | | | |
|---|---|---|---|
| 3,679,635 | 7/1972 | Portus | 528/335 |
| 3,868,352 | 2/1975 | Rich | 528/335 |
| 4,131,712 | 12/1978 | Sprauer | 528/335 |
| 4,433,146 | 2/1984 | Beckers et al. | 544/201 |
| 4,438,146 | 3/1984 | Miyamoto et al. | 528/347 |
| 4,438,257 | 3/1984 | Miyamoto et al. | 528/347 |
| 4,465,821 | 8/1984 | Nielinger et al. | 528/335 |
| 5,010,168 | 4/1991 | Sikkema | 528/349 |
| 5,155,184 | 10/1992 | Laurent et al. | 526/59 |
| 5,416,189 | 5/1995 | Vandevijver et al. | 528/347 |

*Primary Examiner*—James J. Seidleck
*Assistant Examiner*—P. Hampton-Hightower

[57] ABSTRACT

The invention provides a continuous process for the preparation of polyamides, equipment in which the polymerization process can be conducted, and process control methods for said polymerization process.

19 Claims, 2 Drawing Sheets

CONTINUOUS POLYMERIZATION PROCESS FOR POLYAMIDES

BACKGROUND

This invention concerns a continuous process for the preparation of polyamides, the apparatus in which the polymerization process can be conducted, and process control methods useful in said polymerization process.

TECHNICAL BACKGROUND

Some commercially important polyamides, referred to herein as dimonomeric polyamides, require starting monomers of two kinds, one monomer having a pair of carboxylic acid functional reactive groups(diacid) and the other monomer having a pair of amino functional reactive groups (a diamine). This class of polyamide may incorporate more than one diacid and more than one diamine and may incorporate a small amount, usually no more than 10%, of a third kind of starting material having a carboxylic acid functional group and an amino functional group or a functional precursor to such a compound. In the most common method of preparing dimonomeric polyamides, the starting diacid and diamine components are mixed in stoichiometric proportions into a solution containing a large amount of water, typically up to as much weight as the combined weight of the diacid and diamine components. This water is subsequently removed by evaporation which requires a correspondingly large amount of energy. The evaporation of water is usually done at elevated pressure in order to achieve a high enough boiling temperature to prevent the formation of solids. After the evaporation, there must be a pressure reduction step which requires excessive heat to prevent the product from solidifying. The heating is known to cause discoloration and chemical degradation of the product.

Attempts to produce dimonomeric polyamides without the use of water or other solvents have usually been unsuccessful. If one component is a solid, it is difficult to accurately proportion the solid component. If both components are supplied as liquids (melt), these liquids may experience degradation, as a result of the high temperature supplied to keep the components in melt form.

U.S. Pat. No. 4,131,712, endeavors to overcome these difficulties. This patent teaches a process for the preparation of a high molecular weight polyamide, wherein a diacid-rich component and a diamine-rich component are prepared separately in non-stoichiometric proportions and then the diacid-rich component and the diamine-rich component are contacted in liquid state at a high enough temperature to prevent solidification, and in proportions such that the total amounts of diacid and diamine, whether combined or not, are as much as possible stoichiometric. The major utility of the process is in the manufacture of nylon 66.

One difficulty that is encountered as a result of the process in U.S. Pat. No. 4,131,712, where diamine or diamine rich feed is added directly to a reactive polymerizing mixture, is that there is substantial volatilization of the diamine at the reaction temperature, especially during the last step of the process where the proportions of diacid and diamine approach stoichiometric levels and the temperature is the highest. Means are required to prevent the escape of diamine and retain it in the reaction mixture in order to avoid loss of yield and to maintain stoichiometric balance.

U.S. Pat. Nos. 4,433,146 and 4,438,257, teach the use of a partial condenser to condense diamine out of vapor leaving the reaction mixture so as to return the diamine to the reaction mixture. However, the procedure, if used on a commercial scale, with stepwise addition of diamine, appears to require extended periods of time to recycle the diamine.

U.S. Pat. No. 5,155,184 discloses a process for the control of product composition during the manufacture of a polymer, employing near infrared spectroscopy for detecting composition and using a process computer. The disclosure relates to polyolefins; no polyamide polymers are discussed therein.

SUMMARY OF THE INVENTION

The present invention provides a continuous process for the preparation of polyamides, of the group made by joining of one or more diamines with one or more diacids, for example nylon 66. This continuous process has advantages over conventional processes by requiring lower energy consumption, reduced capital cost of equipment, reduced environmental emissions and cost advantages pertaining thereto, and improved product quality. In the process, a process stream of diacid or diacid mixed with diamine is fed, as a molten liquid, into the first stage of a multi-stage reactor and additional diamine is fed into the reactor at one or more of the additional stages. In a vertical reactor, where the first stage is at the top, these additional stages are lower than the first stage of the reactor.

More specifically, this invention provides a continuous process for the manufacture of dimonomeric polyamides, essentially without emission of diamine in the vapor, which process comprises the steps of:

a) providing to a first reaction stage of a multistage reactor, operating at a pressure which can conveniently be essentially atmospheric, a process stream comprising a molten diacid or a molten acid-rich mixture comprising a dicarboxylic acid and a diamine;

b) flowing said process stream through a series of the first reaction stage and at least one more reaction stage;

c) adding to said process stream, in at least one reaction stage beyond the first reaction stage, an additional diamine component as either a vapor or a diamine rich liquid; and d) optionally controlling the balance of acid and amine functional reactive groups (ends) in the resulting dimonomeric polyamide by an appropriate control system.

This invention includes the process above wherein there is also an optional control to maintain column stability using an appropriate column stability control system.

The reaction is conducted in a reaction apparatus equipped with internals provided to cause effective contact of countercurrently flowing diamine or diamine-rich vapor with the molten acid or acid-rich feed stream so as to achieve rapid, efficient scrubbing of the diamine from the countercurrently flowing vapor, providing that the temperature of the first stage and any further stages is sufficiently high to keep solid from forming in the reaction apparatus. It is preferred if the multistage reactor is vertical, with the top stage being the first stage.

This invention can be used to manufacture nylon 66 (poly-hexamethylene adipamide) where the starting materials are molten adipic acid or a molten adipic acid rich mixture of adipic acid and hexamethylene diamine. The acid rich mixture is about 75% to 85% by weight adipic acid and about 15%–25% by weight hexamethylene diamine. The acid rich mixture is preferably about 81% by weight adipic acid and about 19% by weight hexamethylene diamine. In a preferred embodiment the process is carried out in a vertical multistage reactor, having a first stage and one or more additional stages, typically six to eight stages. Hexamethylene diamine is added either as a vapor or a hexamethylenediamine rich liquid to at least one of the reaction stages beyond the first stage. The balance of acid and amine functional reactive groups (ends) in the resulting polyamide is optionally monitored and controlled by an appropriate control system.

In step d) it is preferred that control is accomplished by a near infrared activated feedback control system which, on demand, causes the injection of an appropriately small amount of hexamethylene diamine vapor into or near the bottom stage of the reaction system so as to essentially achieve acid-amine ends balance.

The reaction is conducted in a reaction apparatus equipped with internals, such as but not limited to perforated plates, coils and agitators, so as to cause effective contact of countercurrently flowing diamine or diamine-rich vapor (e.g., hexamethylene diamine or hexamethylene diamine-rich vapor) with the molten acid-rich feed so as to achieve rapid, efficient scrubbing of the diamine from the countercurrently flowing vapor. The temperature of the first stage and any further stages must be sufficiently high to keep solid from forming in the reaction apparatus.

The invention also concerns a continuous process for preparing an essentially anhydrous mixture comprising adipic acid and hexamethylene diamine in a 75–85:15–25, preferably a 81:19, weight ratio comprising the steps of:

(a) heating a heat stable liquid to about 80° C., (b) adding solid adipic acid, (c) agitating at about 80° C., at typically 200 RPM, until a solution is obtained (typically about two hours), (d) adding hexamethylene diamine to reach the desired weight ratio of weight adipic acid:hexamethylene diamine, (e) heating the mixture to from about 120° C. to about 135° C., with agitation, while allowing any water present to evaporate to form an essentially anhydrous molten acid-rich mixture comprising a ratio of 75–85:15–25, preferably 81:19, by weight adipic acid: :hexamethylene diamine, and (f) feeding adipic acid and hexamethylene diamine in a 75–85:15–25, preferably 81:19, ratio to the molten acid rich mixture at the same rate that molten acid-rich feed is withdrawn.

This method of making an acid rich feed is applicable to other diacid-diamine combinations in addition to adipic/hexamethylene diamine.

This invention also provides processing apparatus, in which the process of the present invention is carried out, comprising a vertical multistage reactor equipped with internals, for example perforated plates, coils and agitators, so as to cause effective contact of countercurrently flowing vapor and liquid streams.

This invention further provides a method of process control, by which the process of the present invention is controlled, which method comprises a near infrared activated feedback control system which determines acid-amine ends balance and, where needed, causes the injection of an appropriately small amount of additional diamine into or near the bottom or final stage of the reaction system so as to essentially achieve acid-amine ends balance.

DETAILS OF THE INVENTION

The process can be used to produce a wide variety of dimonomeric polyamides and copolyamides depending on the choice of diacids and diamines.

By "dimonomeric polyamide" herein is meant a polyamide prepared by the condensation polymerization of two monomers, a diacid and a diamine, for example, nylon 66 which is a polyamide prepared from adipic acid (1,6-hexanedioic acid) and hexamethylene diamine.

The diacid component may be selected from aliphatic, alicyclic or aromatic diacids, with the proviso that a diacid be capable of being used in melt form by itself or as a melt or as a dispersion in combination with other diacids or as an acid-rich feed with diamine at a temperature that avoids excessive degradation of the diacid. Specific examples of such acids include glutaric acid, adipic acid, suberic acid, sebacic acid, dodecanedioic acid, 1,2- or 1,3-cyclohexane dicarboxylic acid, 1,2- or 1,3-phenylene diacetic acid, 1,2- or 1,3-cyclohexane diacetic acid, isophthalic acid, terephthalic acid, 4–4'-oxybis (benzoic acid), 4,4'-benzophenone dicarboxylic acid, 2,6-naphthalene dicarboxylic acid, and p-t-butyl isophthalic acid. The preferred dicarboxylic acid is adipic acid.

The diamine component is selected from the group consisting of aliphatic, alicyclic or aromatic diamines. Specific examples of such diamines include hexamethylene diamine, 2-methyl pentamethylenediamine, 2-methyl hexamethylene diamine, 3-methyl hexamethylene diamine, 2,5-dimethyl hexamethylene diamine, 2,2-dimethylpentamethylene diamine, 5-methylnonane diamine, dodecamethylene diamine, 2,2,4- and 2,4,4-trimethyl hexamethylene diamine, 2,2,7,7-tetramethyl octamethylene diamine, meta-xylylene diamine, paraxylylene diamine, diaminodicyclohexyl methane and $C_2$–$C_{16}$ aliphatic diamines which may be substituted with one or more alkyl groups. The preferred diamine is hexamethylene diamine.

An optional third starting material, having a carboxylic acid functional group and an amino functional group or a functional precursor to such a compound, may be selected from 6-aminohexanoic acid, caprolactam, 5-aminopentanoic acid, 7-aminoheptanoic acid and the like.

If the diacid does not suffer excess degradation at a temperature around its melting point, it may be used directly as the feed stream to the first stage of the reactor. If the diacid is combined with one or more diamines to produce an acid-rich feed stream, this may be done continuously or batch-wise, so long as a steady feed stream to the first stage of the reactor is maintained.

The feed stream for the first stage of the reactor comprises a flowable molten diacid or a flowable molten diacid rich mixture comprising the selected diacid and diamine. In the case where the process is used for the preparation of nylon 66, the feed stream for the process comprises flowable molten adipic acid or a flowable molten adipic acid rich mixture comprising adipic acid and hexamethylene diamine. In a preferred embodiment for the preparation of nylon 66, the flowable acid rich mixture comprises a molten mixture comprising approximately 81% by weight of adipic acid and approximately 19% by weight of hexamethylenediamine.

The diamine or diamines that are fed to one or more stages after the first stage of the reactor may be supplied in the form of a liquid or vapor. If fed as a liquid, they undergo substantial vaporization when they come in contact with the hot polymerizing reaction mixture. Pre-vaporization of the diamine feed system removes some of the heat requirement from the reactor and reduces the likelihood of time to time variation in the amount of diamine vapor flow at various points in the reactor.

FIG. 1, described below, shows the internal configuration of a multistage reactor. Standard distillation columns are suitable devices for this purpose except that the liquid residence time in the stages is increased to give time for chemical reaction. Mechanical agitation is provided to enhance the exchange of components between vapor and liquid, to prevent zones of stagnation in the reaction mixture which could lead to gel formation, to facilitate heat transfer and to yield greater time-wise uniformity of product.

The absorption of diamine into a reactive polymeric liquid is found to be most rapid and complete when the liquid is highly acid-rich and at a relatively low temperature. The rate of transfer of diamine from vapor into liquid is sufficiently rapid and complete, even when the liquid is close to a balance of acid and amine ends, and at a high enough temperature to keep high molecular weight polymer molten so that a reactor with six to eight stages is capable of producing balanced polymer and at the same time of retaining in the polymer essentially all of the diamine fed to the reactor.

In comparison with conventional processes, the advantages of the process of the present invention include lower energy consumption, due to the efficient utilization of the heat of the amidation reaction and due to avoiding the need to evaporate off large amounts of water; reduced capital cost of equipment; reduced environmental emissions, due to the efficient absorption of diamine vapor by the acid-rich liquid flow in the reactor; and improved product quality, due to the lower residence time of the polyamide at elevated temperature and to lower final processing temperature. This results in a lower thermal degradation index and reduces the extent of discoloration.

In some cases, and in the preferred case where nylon 66 is the product and adipic acid is the starting dicarboxylic acid, the diacid must be combined with one or more diamines into an acid-rich feed stream in order to secure a feed in which the diacid remains chemically stable. This may be done continuously or batch-wise, as long as a steady feed stream to the first stage of the reactor is maintained. One method is provided in U.S. Pat. No. 4,131,712, col. 2, lines 30–39, which patent is incorporated herein by reference. A preferred method is to carry out this process continuously by combining, at this same rate at which molten acid-rich feed is withdrawn, with agitation, at approximately 120°–135° C., feed streams of solid, granular adipic acid and liquid hexamethylene diamine or hexamethylediamine solution (which is commercially used at 85–100% purity, balance being water). Holding time in the agitated reactor is approximately one to three hours. Holding for longer times is not detrimental to the reaction product.

A preferred method for preparing the acid-rich feed utilized in the preparation of nylon 6,6 in a continuous fashion comprises the steps of (a) heating a heat stable liquid to about 80° C., (b) adding solid adipic acid, (c) agitating at about 80° C. until a solution is obtained, (d) adding hexamethylene diamine to reach the desired 81:19 by weight adipic acid:hexamethylene diamine ratio, (e) heating the mixture to about 125° C. to 135° C., preferably about 130° C., with agitation while allowing any water present to evaporate to form an essentially anhydrous molten acid-rich mixture comprising 81:19 by weight adipic acid:hexamethylene diamine, and (f) feeding adipic acid and hexamethylene diamine in a 75–85:15–25 ratio, preferably a 81:19 ratio, to the molten acid rich mixture at the same rate that molten acid-rich feed is withdrawn.

The heat stable liquid is used to facilitate heat and mass transfer. Water or a stable molten diacid, for example dodecanedioic acid, may be employed. Water is preferred.

Solid crystalline adipic acid is employed. Depending on particle size, time to reach solution state may vary. Typically, agitation at this step is 200 RPM for 2 hours.

Hexamethylene diamine or hexamethylene diamine solution, which may contain up to about 15% water may be used. The amount of water to be evaporated varies. (For example, in cold weather, the diamine is shipped with about 20% water.) If water is employed as the heat stable liquid and hexamethylene diamine solution is used, water to be removed is at a maximum. If a stable molten diacid, for example, dodecanedioic acid, is employed as the heat stable liquid, water removal is minimized.

Essentially anhydrous in the present context means approximately 2% water or less. If a heat stable liquid other than water is used, for example, dodecanedioic acid, once the continuous feed of adipic acid and hexamethylene diamine in an 81:19 ratio to the molten acid rich mixture is commenced, some time will be required before steady state operation is reached. That is, some time will be required before the heat stable liquid other than water is diluted out of the acid-rich feed mixture.

If continuous operation is suspended after step (f) of the process is reached, the mixture may be cooled and reheated and operation recommenced without ill effect without having to repeat steps (a) though (e).

In a most preferred mode, the exit stream from the acid rich mixture makeup vessel to the first stage of the reactor is continuously monitored by near infrared spectrophotometry. The near infrared analysis predicts percent adipic acid. Measurement is done in line and continuously, as the material flows through the reactor feed pipe. Based on this analysis, changes are made continuously in the hexamethylene diamine (HMD) feed rate. A computer causes the HMD injection to respond to bring the composition closer to the set point.

To produce a product with time-wise uniformity suitable for commercial end uses, it is necessary to monitor and control the difference between the concentration of the carboxylic acid functional end groups and the concentration of amine functional end groups in the resulting dimonomeric polyamide by an appropriate control system. This requirement is especially stringent for product that will eventually be formed into fibers that will be treated with dyes that attach themselves to one or the other of the two functional groups.

To achieve this control a measurement is made of some characteristic in the polymer leaving the final stage of the reactor which is sufficiently sensitive to the concentration difference. The method must be accurate to within about plus or minus 0.5 units in the difference in acid and amine ends concentrations (gram equivalent ends per million grams of polymer). Any analytical method of this approximate accuracy, that is rapid enough to give answers in a timely enough fashion to effect process control, would be suitable. In general, manual titrimetric methods, though sufficiently accurate, are not rapid enough to give meaningful process control. A preferred method of monitoring reactor output is by near-infrared spectrophotometry. The near-infrared analysis measures the difference between acid and amine ends to an acceptable degree of accuracy with a sufficiently timely response. Based on this analysis, changes are made in the hexamethylene diamine feed into or near the bottom stage of the reactor system. By "into or near" is meant that this feed is into the bottom reactor stage, into the stage immediately above the bottom stage or into the transfer line leading out of the bottom reactor stage. Most preferably, this feed is into the transfer line.

The desired product from the transfer line is generically described, in the case of nylon 6,6 processing, as intermediate molecular weight nylon. As such it is suitable for sale as is, or it can be further processed to higher molecular weight nylon by methods known in the art, for example, in an extruder or through solid phase polymerization.

Figure 1:
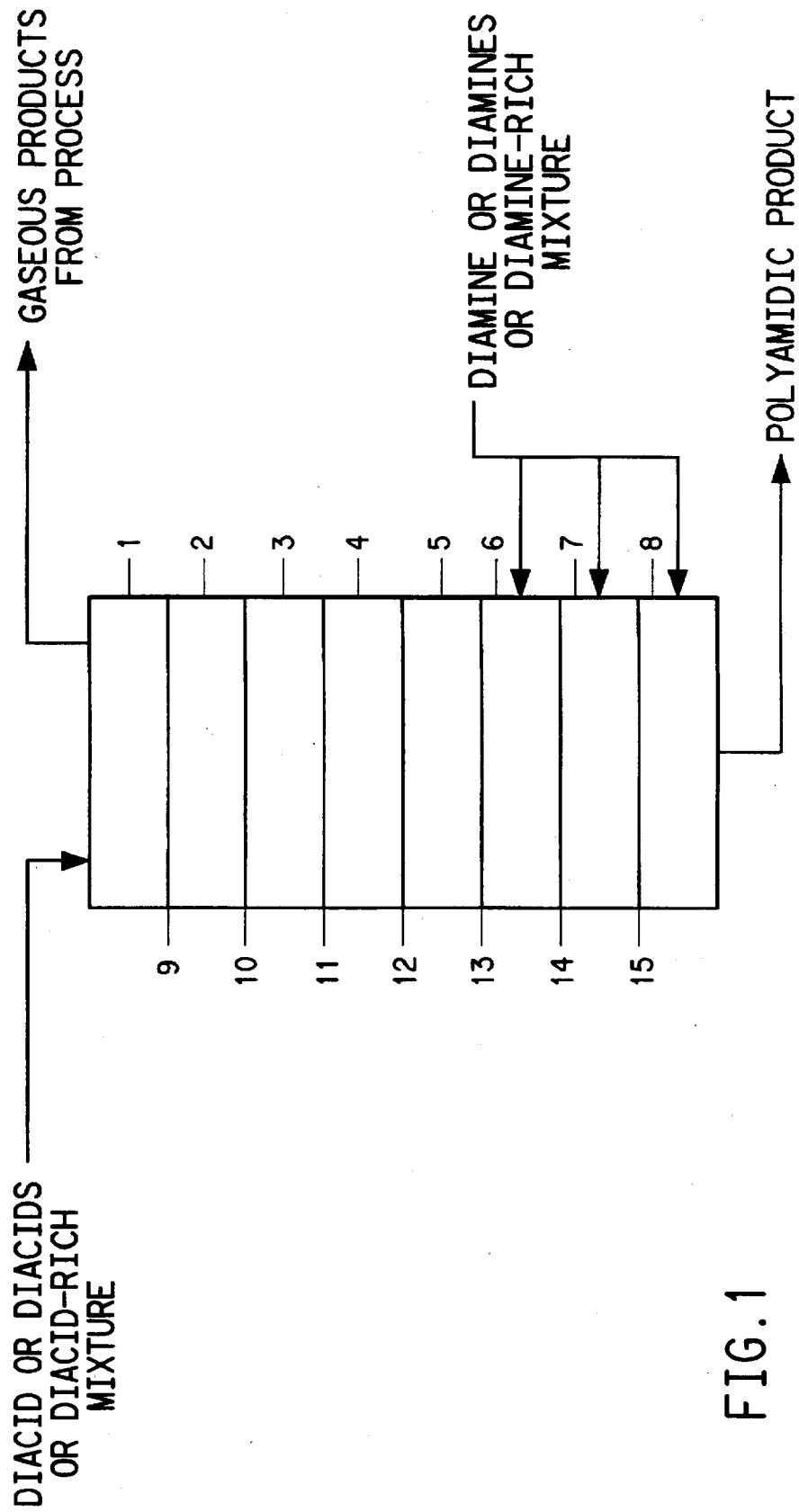
FIG. 1 describes diagramatically the internal configuration of a reactor. The reactor is divided into discrete stages 1-8 using perforated barriers, 9-15, between stages, which barriers allow separate passages for vapor and liquid flows from stage to stage.
Figure 2:
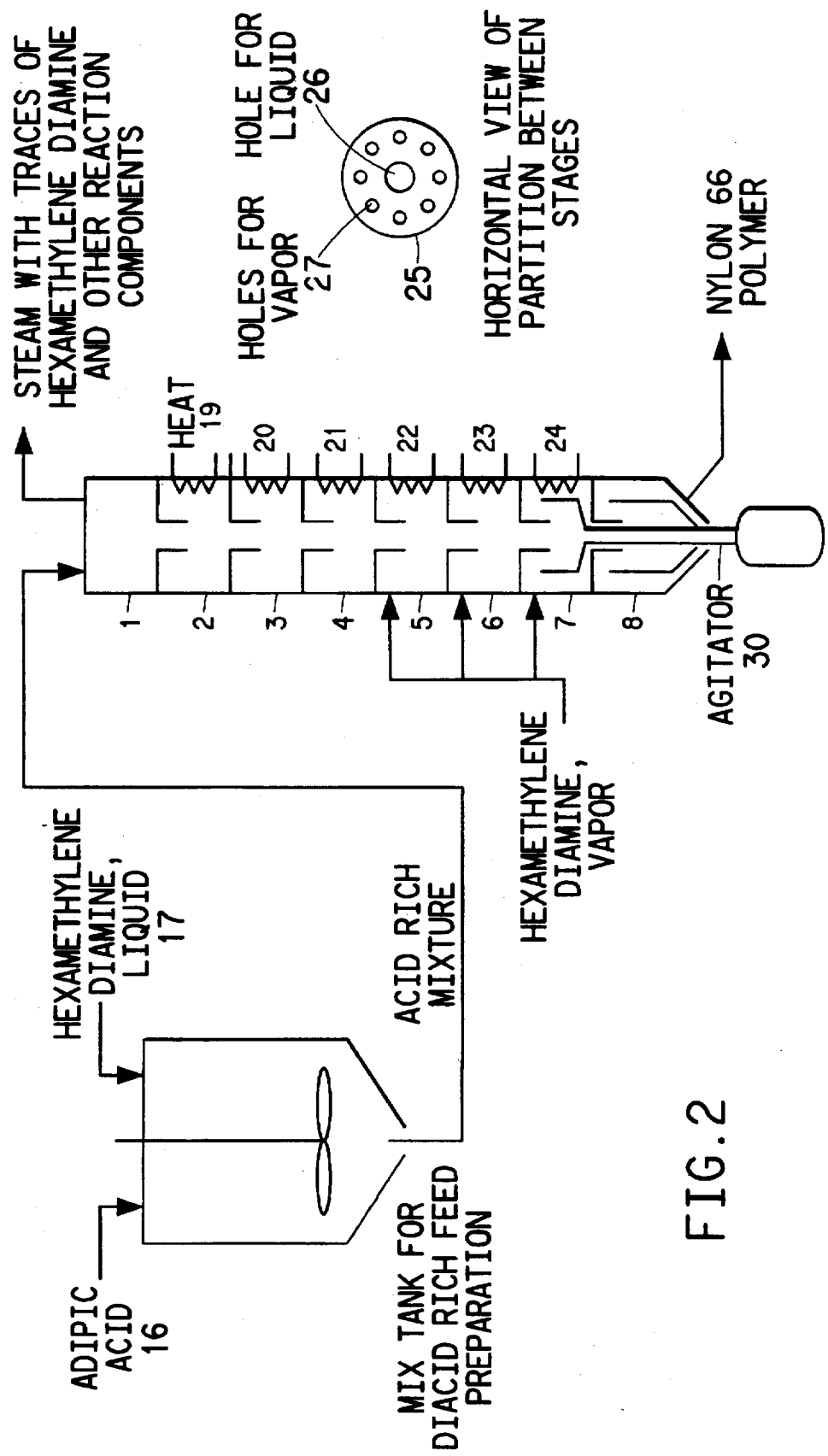
FIG. 2 describes an eight stage reactor. Feed material streams 16 and 17 are fed into mix tank 18 for diacid rich feed preparation. The acid rich mixture is then fed into stage 1. The column is heated by heat sources 19-24. Agitator 30 is located at the bottom of the reactor. Hexamethylene diamine vapor is fed into the acid rich mixture at various stages 2 through 8. Nylon 66 polymer is removed after bottom stage 8. Beyond the first stage, each stage is separated from the stage above and below it by a horizontal perforated barrier 25 with openings 26 and 27, respectively, for liquid and vapor to flow through. Liquid flowing from the bottom stage 8 is continuously removed at the bottom of the reactor.

Vapor of hexamethylene diamine is supplied continuously into the upper part of each of three stages above the bottom stage. This vapor and any additional vapor of diamine or steam formed within the reactor flows from each stage to the stage above through a multiplicity of small holes in barrier 25, thus bringing the vapor into intimate contact with the liquid in the stage above. Vapor flowing through the top stage is continuously removed from the top of the reactor. Heat may be supplied at each stage by means of heat sources 19-24 to prevent the formation of solid material.

EXAMPLES

Near-Infrared Monitoring: Pre-polymer Method I

In monitoring the exit stream from the column, the goal is to first measure then control the ends balance and the conversion. In the case of the preferred embodiment, the preparation of nylon 66, the ends balance and the conversion are specified by determining any two of the following: amine ends concentration ([A]), carboxyl ends concentration ([C]), difference of ends (DE or [C]−[A]) and sum of ends (SE or [C]+[A]). Polymer relative viscosity (RV) can be used in place of sum of ends. The analysis and control may be carried out essentially continuously.

In a demonstration of the preferred process, the preparation of nylon 66, near-infrared spectra of the pre-polymer melt were obtained using a UOP/Guided Wave Model 300P near-infrared spectrometer. A pair of 5.5"×0.25" diameter sapphire-windowed optical transmission probes (UOP/Guided Wave), available from UOP/Guided Wave, El Dorado Hills, Calif., were inserted directly into the exit stream of the column using a NIR cell located at the exit of the column. The NIR cell consisted of a block of 316 stainless steel through which perpendicular holes had been drilled; the pre-polymer melt flowed through a 5 mm diameter channel the length of the cell; the GW probes were inserted perpendicular to the flow and held in place with Conax® fittings manufactured by Conax Buffalo Corp., 2300 Walden Avenue, Buffalo, N.Y. 14225 and Kalrez® (DuPont) seals. The optical pathlength between the probes was about 5 mm. Two flat band-heaters were placed around the block cell. The probes were connected to the spectrometer using 20 meters of Jacketed 500 micron single fiber optic cable (UOP/Guided Wave).

During a three day test run, the near-infrared monitoring system was programmed to automatically scan and save an absorbance spectrum (the average of 8 scans) of the pre-polymer melt once every five minutes. At roughly fifteen minute intervals, discrete samples were taken at the exit of the column (a few inches beyond the NIR cell). The samples were analyzed by titration to determine the acid and amine end concentrations, [C] and [A]. See Volume 17 of the "Encyclopedia of Industrial Chemical Analysis" published by John Wiley and Sons (1973), page 293. The lab results were reported as acid and amine ends, in meq ends/kg polymer, to the nearest 0.1 end.

At the conclusion of the test, the NIR spectra nearest (within 5 minutes) in time to each of the lab samples collected were extracted from the spectra in the data set to give a calibration set of 26 samples. The calibration set spanned a range of 100 to 400 amine ends and 50 to 170 acid ends. The calibration spectra were smoothed and baseline corrected using Scanner 300 software supplied with the UOP/Guided Wave spectrometer.

Partial least squares (PLS) models were developed using the wavelength region between 1000 and 2100 nm. PLS models were developed using the Unscrambler® (Camo A/S, Trondheim, Norway) chemometrics software package following the directions supplied by the vendor. The use of PLS models is widely known and taught in the open literature.

For amine ends, a two-factor PLS model explained 98.0% of the X-variance and 97.2% of the Y-variance in the calibration set. It predicted the pre-polymer composition with an accuracy (SEP) of 15.8 amine ends and a correlation coefficient (R) of 0.987.

This calibration set did not contain sufficient variation to independently model acid ends.

Validation was done by predicting composition data with this model in real time during subsequent unit operations. The model predictions were converted using an empirical linear equation from amine ends ([A]) to difference of ends (DE) for operator convenience, since it was found that over the short term, the amine ends values and the difference of ends values were highly correlated. The resulting DE predictions tracked the lab results (although with an offset that changed periodically), responded correctly to known process changes, and had a repeatability (standard deviation of consecutive predictions) of 1.3 ends over an hour and 0.95 ends over a ten minute period.

The model obtained in this manner was used to control the composition of the pre-polymer melt. Depending on the value of DE obtained, and the desired value, changes in the column operation were made.

Near-Infrared Monitoring: Pre-polymer Method II

In monitoring the exit stream from the column, the goal is to first measure then control the ends balance and the conversion. In the case of the preferred embodiment, the preparation of nylon 66, the ends balance and conversion are specified by determining any two of the following: amine ends concentration ([A]), carboxyl ends concentration ([C]), difference of ends (DE or [C]−[A]) and sum of ends (SE or [C]+[A]). Polymer reactive viscosity (RV) can be used in place of ends. The analysis and control may be carried out essentially continuously.

In a demonstration of the preferred process, the preparation of nylon 66, near-infrared spectra of the pre-polymer melt were obtained using a UOP/Guided Wave Model 300P near-infrared spectrometer. A pair of 5.5"×0.25" diameter sapphire-windowed optical transmission probes (UOP/Guided Wave) were inserted into sapphire-windowed stainless steel "sleeves" in a NIR cell located in the transfer line following the column. The probes did not directly contact the pre-polymer melt. The cell was heated by hot oil. The optical pathlength between the probes was 5 mm. The probes were connected to the spectrometer using about 100 meters of jacketed 500 micron single fiber optic cable (UOP/Guided Wave).

The near-infrared monitoring system was programmed to automatically scan and save an absorbance spectrum (the average of 8 scans) of the pre-polymer melt once every fifteen minutes. Once an hour discrete samples were taken at the pelletizer at the end of the transfer line. The samples were analyzed by titration to determine the difference of ends, DE, and the amine end concentration, [A]. The lab results were reported in meq ends/kg polymer or "ends" to the nearest 0.1 end.

Over a four day period, the NIR spectra nearest (within 5 minutes) in time to each of the lab samples collected were extracted from the spectra in the data set to give a calibration set of 67 samples. The calibration set spanned a range of −167.0 to +81.0 difference of ends and 33.0 to 221.4 amine ends. The calibration spectra were smoothed and baseline corrected using Scanner 300 software supplied with the UOP/Guided Wave spectrometer.

Partial least squares (PLS) models were developed using the wavelength region between 1504 nm and 1576 nm. The PLS model was developed using the Unscrambler® (Camo A/S, Trondheim, Norway) chemometrics software package following the directions supplied by the vendor. The use of PLS models is widely known and taught in the open literature.

For difference of ends, a two-factor PLS model explained 99.1% of the X-variance and 95.2% of the Y-variance in the calibration set. It predicted the pre-polymer composition with an accuracy (SEP) of 13.3 ends and a correlation coefficient (R) of 0.977.

This calibration set did not contain sufficient variation to independently model sum of ends.

Validation was done by predicting composition data with this model for a different two day period. The model predictions tracked the lab results (though with an offset that changed periodically) and had a repeatability (standard deviation of consecutive predictions) of 1.5 ends over an hour and 0.50 ends over a ten minute period.

A model obtained in a similar manner was used to control the composition of the pre-polymer melt. Depending on the value of DE obtained, and the desired value, changes in the column operation were made.

Near-Infrared Monitoring: Acid-rich Feed

In monitoring the exit stream from the acid-rich makeup vessel (also referred to herein as acid-rich feed ARF), the goal is to first measure then control the chemical composition (the relative amount of diacid and diamine components). In the case of the preferred embodiment, the preparation of nylon 66, this is conveniently expressed as weight percent adipic acid. If the preparation of the acid rich mixture is carried out in a continuous fashion, the analysis and control can also be carried out essentially continuously.

In a demonstration of the preferred process, the preparation of nylon 66, near-infrared spectra of the ARF were obtained using a UOP/Guided Wave Model 300P near-infrared spectrometer. A pair of 5.5"×0.25" diameter sapphire-windowed optical transmission probes (UOP/Guided Wave) were inserted directly into the 0.25" tubing exit stream of the acid-rich feed unit using a Swagelok® cross, available from Swagelok Co., Solon, Ohio 44139 and two Conax® fittings, equipped with Viton® O-ring seals, both available from Conax Buffalo Corp., 2300 Walden Avenue, Buffalo, N.Y. 14225. The optical pathlength between the probes was about 5 mm. The probes were connected to the spectrometer using 20 meters of jacketed 500 micron single fiber optic cable UOP/Guided Wave).

During a two day test run the ARF composition was varied stepwise from 77% adipic acid to 85% adipic acid. The near-infrared monitoring system was programmed to automatically scan and save an absorbance spectrum (the average of 8 scans) of the ARF once every five minutes. At roughly half-hour intervals, discrete samples were taken at the exit of the ARF unit (a few inches beyond the NIR probes). The samples were analyzed by titration. Twenty five grams of acid-rich feed were dissolved in 325 mL of water at 25° C. The solution was titrated with a 50% by weight solution of hexamethylene diamine in water to a potentiometric endpoint of 7.600 pH. (The calculations assumed a sample moisture level of 2.0% and no conversion of diacid and diamine to nylon 66 pre-polymer.) The lab results were reported as weight percent adipic acid (dry basis) to the nearest 0.1%.

At the conclusion of the test, the NIR spectra nearest (within 5 minutes) in time to each of the lab samples were extracted from the spectra in the data set to give a calibration set of 57 spectra. The calibration spectra were smoothed and baseline corrected using Scanner 300 software supplied with the UOP/Guided Wave spectrometer.

Partial least squares (PLS) models were developed using the wavelength region between 1000 nm and 1670 nm. The PLS models were developed using the Unscrambler® (Camo A/S, Trondheim, Norway) chemometrics software package following the directions supplied by the vendor. The use of PLS models is widely known and taught in the open literature. A two-factor PLS model explained 99.6% of the X-variance and 97.3% of the Y-variance in the calibration set. It predicted the ARF composition with an accuracy (SEP) of 0.17% adipic acid and a correlation coefficient (R) of 0.989.

Validation was done by predicting composition data with this model for the other obtained spectra. The model predictions tracked the lab results, responded correctly to known process changes, and had a repeatability (standard deviation of consecutive predictions) of 0.03% adipic acid.

Further validation was done by predicting composition data with this model in real time during a subsequent test run. During this run the model predictions tracked the lab results (although with an offset of about −0.6% adipic acid), responded correctly to known process changes, and had a repeatability of 0.02% adipic acid.

The model obtained in this manner was used to control the composition of the ARF. Depending on the value of % adipic acid obtained, and the desired value, changes in the reactant ratios were made.

Example 1

A molten acid-rich mixture, consisting of 81% by weight of adipic acid and 19% by weight of hexamethylene diamine was supplied continuously to the top of a 4 inch diameter vertical reactor. The reactor was divided into eight stages, each stage separated from the stage above and below it by a horizontal perforated barrier. Reactor temperature was controlled so that a temperature gradient existed, with the top stage held at 178° C. and the bottom stage at 276° C. Liquid flowed from each stage to the stage below it through an opening in the barrier that was fitted with a tube leading into and below the surface of the reaction mixture in the stage below. Liquid flowing through the bottom stage was continuously removed from the bottom of the reactor.

Vapor of hexamethylene diamine was supplied continuously into the upper part of each of the bottom three stages. This vapor and any additional vapor of diamine or steam formed within the reactor flowed from each stage to the stage above through a multiplicity of small holes in the barrier, thus bringing the vapor into intimate contact with the liquid in the stage above. Vapor flowing through the top stage was continuously removed from the top of the reactor. Heat was supplied at each stage to prevent the formation of solid material.

The liquid leaving the bottom of the vessel was analyzed and found to have a carboxyl end content between 69 and 156 gram equivalents per million grams of sample, an amine end content of between 38 and 136, and a Relative Viscosity of between 18 and 28 (as measured at 25° C. as a 8.4% by weight solution in a solvent consisting of 90% formic acid and 10% water and compared with the viscosity of the solvent at 25° C.). Based on the end group content, the number average molecular weight of the polymer product was 10,500.

The vapor leaving the top of the reactor was analyzed and found to contain less than 100 parts per million by weight of hexamethylene diamine. This means a loss of diamine of 0.000016 parts by weight per part of polymer. Typical commercial processes for making nylon 66 lose between 0.001 and 0.002 parts of diamine per part of polymer produced.

Example 2

A molten acid-rich mixture, consisting of 81% by weight of adipic acid and 19% by weight of hexamethylene diamine was supplied continuously to the top of a vertical reactor at a rate of approximately 200 pounds per hour. The reactor was 15.5 inches in internal diameter and about 17 feet high. It was divided into eight stages, each separated from the stage above and below it by a horizontal perforated barrier. Liquid flowed from each stage to the stage below through an opening in the barrier that was fitted with a tube leading into and below the surface of the reaction mixture in the stage below. Liquid flowing through the bottom stage was continuously removed from the bottom of the reactor. Vapor of hexamethylene diamine was supplied continuously into the upper part of each of the three stages. Total flow of diamine was approximately 89 pounds per hour. This vapor and any additional vapor of diamine or steam formed within the reactor flowed from each stage to the stage above through a multiplicity of small holes in the barrier, thus bringing it into intimate contact with the liquid in the stage above. Vapor flowing through the top stage was continuously removed from the top of the reactor. Heat was supplied to each stage as required to prevent the formation of solid material. The polymeric material leaving the bottom of the reactor passed through a length of pipe before being sampled. The average residence time in the pipe was about six minutes, which provided time for additional reaction in the liquid. The liquid leaving the end of the pipe was analyzed and found to have an average carboxyl end content of 111.5 (plus or minus 20) gram equivalents per million grams of sample, an average amine end content of 71 (plus or minus 13), and an average Relative Viscosity of 25.1 (plus or minus 3); the RV was calculated based on the sum of the carboxyl and amine ends using a standard formula. Based on the end group content, the number average molecular weight of the polymer product was 10,960. These results were obtained during a period of continuous operation of 31 hours.

What is claimed is:

1. A continuous process for the manufacture of dimonomeric polyamide which process comprises the steps of:
    a) providing to a first reaction stage of a vertical multistage reactor, said reactor equipped with internals which enable it to cause effective contact of countercurrently flowing diamine or diamine-rich vapor with a molten acid or acid-rich process stream, having a first stage and one or more additional stages, a process stream comprising a molten diacid or a molten acid-rich mixture comprising a dicarboxylic acid and a diamine;
    b) flowing said process stream through a series of a first reaction stage and at least one more reaction stage;
    c) adding to said process stream, in at least one of the reaction stages beyond the first reaction stage, an additional diamine component as either a vapor or a diamine rich liquid;
    d) maintaining the temperature of the first reaction stage and any further stages at a sufficiently high temperature to keep solid from forming in the reaction apparatus.

2. A continuous process for the manufacture of dimonomeric polyamide which process comprises the steps of:
    a) providing to a first reaction stage of a vertical multistage reactor, said reactor equipped with internals which enable it to cause effective contact of countercurrently flowing diamine or diamine-rich vapor with a molten acid or acid-rich process stream, having a first stage and one or more additional stages, a process stream comprising a molten diacid or a molten acid-rich mixture comprising a dicarboxylic acid and a diamine;
    b) flowing said process stream through a series of a first reaction stage and at least one more reaction stage;
    c) adding to said process stream, in at least one of the reaction stages beyond the first reaction stage, an additional diamine component as either a vapor or a diamine rich liquid;
    d) controlling the balance of acid and amine ends in the resulting dimonomeric polyamide by an appropriate control system; and
    e) maintaining the temperature of the first reaction stage and any further stages at a sufficiently high temperature to keep solid from forming in the reaction apparatus.

3. The process of claim 1 wherein the product manufactured is poly(hexamethylene adipamide), (nylon 66), and wherein the process stream of step (a) comprises molten adipic acid or a molten adipic acid-rich mixture comprising adipic acid and hexamethylene diamine and the additional diamine component added in step (c) is hexamethylene diamine added either as a vapor or a hexamethylenediamine rich liquid.

4. The process of claim 2 wherein the product manufactured is poly(hexamethylene adipamide), (nylon 66), and wherein the process stream of step (a) comprises molten adipic acid or a molten adipic acid-rich mixture comprising adipic acid and hexamethylene diamine and the additional diamine component added in step (c) is hexamethylene diamine added either as a vapor or a hexamethylenediamine rich liquid.

5. The Process of claim 3 wherein the molten acid-rich mixture of step (a) comprises approximately 81% by weight of adipic acid and approximately 19% by weight of hexamethylene diamine.

6. The Process of claim 4 wherein the molten acid-rich mixture of step (a) comprises approximately 81% by weight of adipic acid and approximately 19% by weight of hexamethylene diamine.

7. The process of claim 1 or claim 2 conducted at essentially atmospheric pressure.

8. The process of claim 2 wherein the control system of step (d) is a feedback control system which infers the acid-amine end balance from the infrared spectrum of the polymer product and which, on demand, injects an appropriately small amount of hexamethylene diamine vapor into or near the bottom stage of the reaction system so as to essentially achieve acid-amine ends balance.

9. The process of claim 1 or 2 wherein the diacid is selected from the group consisting of aliphatic, alicyclic and aromatic diacids.

10. The process of claim 9 wherein the diacid is selected from glutaric acid, adipic acid, suberic acid, sebacic acid, dodecanedioic acid, 1,2- or 1,3-cyclohexane dicarboxylic acid, 1,2- or 1,3-phenylene diacetic acid, 1,2- or 1,3-cyclohexane diacetic acid, isophthalic acid, terephthalic acid, 4,4-oxybis (benzoic acid), 4,4-benzophenone dicarboxylic acid, 2,6-naphthalene dicarboxylic acid and p-t-butyl isophthalic acid.

11. The process of claim 10 wherein the diacid is is adipic acid.

12. The process of claim 1 wherein the diamine component is selected from the group consisting of aliphatic, alicyclic and aromatic diamines.

13. The process of claim 12 wherein the diamine is selected from the group consisting of hexamethylene diamine, 2-methyl pentamethylenediamine, 2-methyl hexamethylene diamine, 3-methyl hexamethylene diamine, 2,5-dimethyl hexamethylene diamine, 2,2-dimethylpentamethylene diamine, 5-methylnonane diamine, dodecamethylene diamine, 2,2,4- and 2,4,4-trimethyl hexamethylene diamines, 2,2,7,7-tetramethyl octamethylene diamine, meta-xylylene diamine, paraxylylene diamine, diaminodicyclohexyl methane and $C_2$–$C_{16}$ aliphatic diamines, optionally substituted with one or more $C_1$ to $C_4$ alkyl groups.

14. The process of claim 13 wherein the diamine is hexamethylene diamine (HMD).

15. A process of claim 2 wherein process control comprising a near infrared activated feedback control system which infers the acid-amine end balance from the infrared spectrum of the polymer product and which on demand, injects an appropriately small amount of hexamethylene diamine vapor into or near the bottom stage of a reaction system so as to essentially achieve acid-amine ends balance.

16. A continuous process for preparing an essentially anhydrous mixture comprising adipic acid and hexamethylene diamine in a 75–85:15–25 weight ratio comprising the steps of:

(a) heating a heat stable liquid to about 80° C., (b) adding solid adipic acid, (c) agitating at about 80° C. until a solution is obtained, (d) adding hexamethylene diamine to reach the desired 75–85:15–25 by weight adipic acid:hexamethylene diamine ratio, (e) heating the mixture to about 120° C. to about 135° C., with agitation, while allowing any water present to evaporate to form an essentially anhydrous molten acid-rich mixture comprising 75–85:15–25 by weight adipic acid:hexamethylene diamine, and (f) feeding adipic acid and hexamethylene diamine in an 75–85:15–25 ratio to the molten acid rich mixture at the same rate that molten acid-rich feed is withdrawn.

17. The process of claim 16 wherein the ratio of adipic acid to hexamethylene diamine in the molten acid-rich mixture in step (e) is 81:19 and the ratio of adipic acid to hexamethylene diamine feed in (f) is 81:19.

18. Process of claim 1 wherein the molten acid-rich mixture is provided in a continuous process.

19. The process of claim 16 wherein the molten acid-rich mixture is provided in a continuous process.

* * * * *